No. 854,393. PATENTED MAY 21, 1907.
R. D. WIRT.
REGULATOR.
APPLICATION FILED JULY 24, 1906.
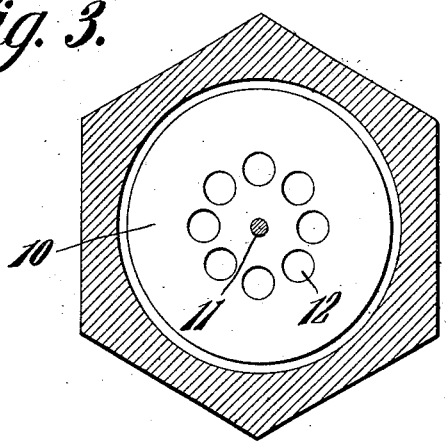
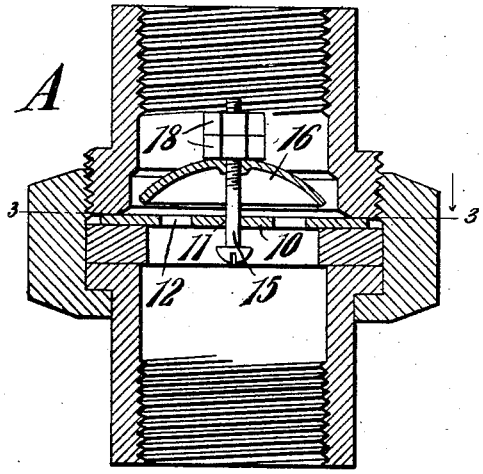
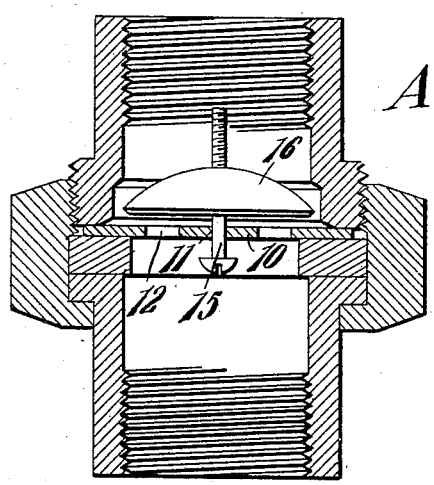
WITNESSES:
E. K. Stewart
Jno. E. Parker
Reuben D. Wirt
INVENTOR
By C. A. Snow & Co.
ATTORNEYS

UNITED STATES PATENT OFFICE.

REUBEN D. WIRT, OF PHILADELPHIA, PENNSYLVANIA.

REGULATOR.

No. 854,393.　　　　　Specification of Letters Patent.　　　　Patented May 21, 1907.

Application filed July 24, 1906. Serial No. 327,576.

*To all whom it may concern:*

Be it known that I, REUBEN D. WIRT, a citizen of the United States, residing at Philadelphia, in the county of Philadelphia and State of Pennsylvania, have invented a new and useful Regulator, of which the following is a specification.

This invention relates to pressure regulators, and has for its principal object to provide a fluid pressure regulator of very simple and economical construction which may be advantageously employed for regulating the pressure of gas and other fluids.

A further object of the invention is to provide a fluid pressure regulator which will automatically cut off the back flow of gas and the surging of gas and air through the meter when the gas is suddenly cut off, or where there is fluctuation due to variation in the pressure or to condensation in the pipes.

A further object of the invention is to provide a fluid pressure regulator which may be readily adjusted in order to maintain any given pressure by the employment of small auxiliary weights which may be added to, or removed from the regulator proper in order to maintain any desired pressure at the burners.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a fluid pressure regulator constructed in accordance with the invention, showing the employment of a pair of detachable weights for the purpose of reducing the pressure of the gas. Fig. 2 is a similar view, showing the regulator in elevation, the weights having been detached. Fig. 3 is a sectional plan view on the line 3—3 of Fig. 1.

Similar numerals of reference are employed to indicate corresponding parts throughout the several figures of the drawings.

The device forming the subject of the present invention may be placed in any ordinary union A, as for instance the union by which a gas meter is coupled to the service pipe. Within the union and supported thereby is a disk 10 having a central opening 11 and provided with a number of perforations 12, the latter being preferably arranged in an annular series around the opening 11. The opening 11 serves as a guide for the unthreaded lower end of a screw 15, the head of which serves by engagement with the lower face of the disk to limit the upward movement of the regulator. The regulator is in the form of a bell 16 of sufficient diameter to extend over all of the openings 12, and at its center is a threaded opening for the reception of the threaded portion of the screw 15, the screw permitting adjustment of the movement of the regulator, so that when the latter is raised to its full height, the distance between its outer lower edge and the upper face of the disk 15 may be varied to form a gas passage of any desired area.

The incoming gas will flow through the openings 12, and striking against the bell 16 will raise the same, a portion of the energy or pressure of the gas being thus utilized and the pressure being reduced, so that blowing at the burners will be prevented. Should the burners be turned off, the regulator may sink until its lower edge is in engagement with the top of the disk 10, cutting off the flow and preventing the drawing in of air at the burners and its passage to and through the meter, and should there be any sudden cut off at the main through breakage of the main or from other cause, the regulator will move to closed position, and the surging of the gas through the meter will be prevented, thus avoiding the registration by the meter of gas or fluid which has not been consumed.

As the pressure of gas varies in different localities, the regulating bell may be made of any diameter, and of any weight, and being adjustable on its threaded stem the user may make the necessary adjustment to maintain a uniform and predetermined pressure at the burners.

The upper portion of the threaded stem extends some distance above the top of the regulating bell and is threaded for the reception of the adjustable weights 18. The weights may be of any desired size and one or two or more may be added as occasion requires.

I claim:—

A fluid pressure regulator adapted for connection in an ordinary pipe union, and comprising a disk, the marginal portion of which is arranged to be clamped between the members of the union, said disk having a centrally disposed unthreaded opening, and a plurality of openings surrounding the central opening, a dished regulating valve disposed above the disk and adapted to cover all of the openings, said valve having a centrally disposed threaded opening, an elongated headed screw having an unthreaded portion extending through the unthreaded opening at the center of the disk and having threaded engagement with the threaded opening of the valve to permit relative adjustment of the valve and screw, the head at the lower end of the screw serving by engagement with the disk to limit the opening movement of said valve, and an auxiliary valve closing weight detachably mounted on the upper end of said screw to assist in forcing the valve to closed position against the pressure of the fluid.

In testimony that I claim the foregoing as my own, I have hereto affixed my signature in the presence of two witnesses.

REUBEN D. WIRT.

Witnesses:
FRANK REOP,
ARTHUR SEMPLE.